United States Patent
Barraci et al.

(10) Patent No.: US 8,660,719 B2
(45) Date of Patent: Feb. 25, 2014

(54) FOUR-DIMENSIONAL FLYABLE AREA DISPLAY SYSTEM FOR AIRCRAFT

(75) Inventors: Nima Barraci, Frankfurt (DE); Thorsten Wiesemann, Hofheim (DE)

(73) Assignee: The Boeing Company, Chicago, IL (US)

( * ) Notice: Subject to any disclaimer, the term of this patent is extended or adjusted under 35 U.S.C. 154(b) by 49 days.

(21) Appl. No.: 13/409,598

(22) Filed: Mar. 1, 2012

(65) Prior Publication Data
US 2013/0231803 A1 Sep. 5, 2013

(51) Int. Cl.
*G06G 7/76* (2006.01)

(52) U.S. Cl.
USPC ............. 701/14; 701/458; 701/527; 701/528; 701/533

(58) Field of Classification Search
USPC ........... 701/3, 4, 14, 458, 532, 533, 410, 527, 701/528
See application file for complete search history.

(56) References Cited

U.S. PATENT DOCUMENTS

| | | | | |
|---|---|---|---|---|
| 4,884,220 A | * | 11/1989 | Dawson et al. | 345/573 |
| 4,965,845 A | * | 10/1990 | Chan et al. | 382/166 |
| 6,289,277 B1 | * | 9/2001 | Feyereisen et al. | 701/528 |
| 6,675,095 B1 | * | 1/2004 | Bird et al. | 701/301 |
| 7,280,896 B2 | * | 10/2007 | Morizet et al. | 701/3 |
| 7,874,521 B2 | * | 1/2011 | Shuster | 244/175 |
| 7,966,125 B2 | * | 6/2011 | Wipplinger et al. | 701/455 |
| 8,032,266 B2 | * | 10/2011 | Bitar et al. | 701/3 |
| 8,095,302 B2 | * | 1/2012 | Lutz et al. | 701/445 |
| 8,195,383 B2 | * | 6/2012 | Wipplinger et al. | 701/409 |
| 8,200,378 B1 | * | 6/2012 | Chiew et al. | 701/4 |
| 8,200,416 B2 | * | 6/2012 | Aspen | 701/454 |
| 2006/0235581 A1 | * | 10/2006 | Petillon | 701/3 |
| 2008/0103641 A1 | * | 5/2008 | Ratcliffe | 701/3 |
| 2008/0218384 A1 | * | 9/2008 | Varadarajan et al. | 340/961 |
| 2009/0093953 A1 | * | 4/2009 | Wiesemann et al. | 701/200 |
| 2010/0100308 A1 | * | 4/2010 | Coulmeau et al. | 701/122 |

OTHER PUBLICATIONS

Singlinger, "Ein Beitrag zur dreidimensionalen Darstellung von Nominal-Trajektorien in perspektivischen Flügfuhrungsanzeigen", dissertation, Vom Fachbereich Maschinenbau an der Technischen Universitat Darmstadt, Jan. 2008, 25 Pages.
Derrison, "Introduction to the SESAR Concept of Operations", SESAR Consortium, Air-TN 1st Forum, EED Bretigny, Jan. 2007, 39 Pages.
"Concept of Operations for the Next Generation Transportation System", Joint Planning & Development Office, Jun. 2007, 219 Pages.
"Welcome to the Jetplanner Training web portal", Jeppesen, copyright 2009, 1 Page, accessed Feb. 29, 2012, http://www.jetplanner.info/.
"A New Major Initiative of European Cooperation in Flight safety: Flysafe", Advisory Council for Aeronautics in Europe, Feb. 2005, 6 Pages, accessed Feb. 29, 2012, http://www.eu-flysafe.org/EU-Flysafe_Public/Download/generalInfo/mainColumnParagraphs/01/document/FLY_730THA_EXT_Le-Bourget2005_English_A03.pdf.

(Continued)

*Primary Examiner* — Russell Frejd
(74) *Attorney, Agent, or Firm* — Yee & Associates, P.C.

(57) ABSTRACT

A method and apparatus for displaying information for an aircraft. Information is identified for the aircraft. An aeronautical chart is displayed on a display system. An envelope is displayed in the aeronautical chart based on the information. The envelope defines a space flyable by the aircraft that meets a number of objectives.

20 Claims, 9 Drawing Sheets

(56) References Cited

OTHER PUBLICATIONS

"Jeppesen Electronic Flight Bag Applications for Airbus Aircraft", Jeppesen, Jan. 2006, 3 Pages.

"3D Cockpit Displays of Traffic Information (CDTI)", National Aeronautics and Space Administration, Flight Deck Display Research Lab, Jan. 2012, 4 Pages.

"A310, Vienna Austria, 2000 (LOC HF HW)," SKYbrary Wiki, Accidents and Incidents, Vienna International Airport, 6 Pages, accessed Mar. 15, 2012, http://www.skybrary.aero/index.php/A310,_Vienna_Austria,_2000_(LOC_HF_AW).

* cited by examiner

FIG. 10
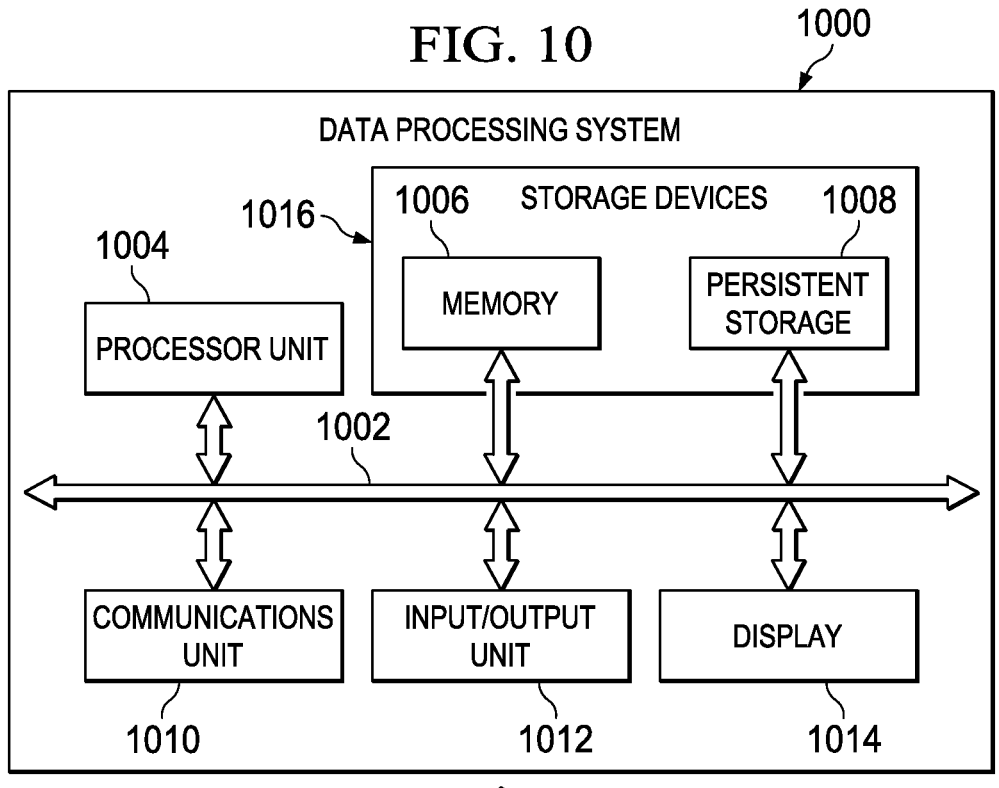
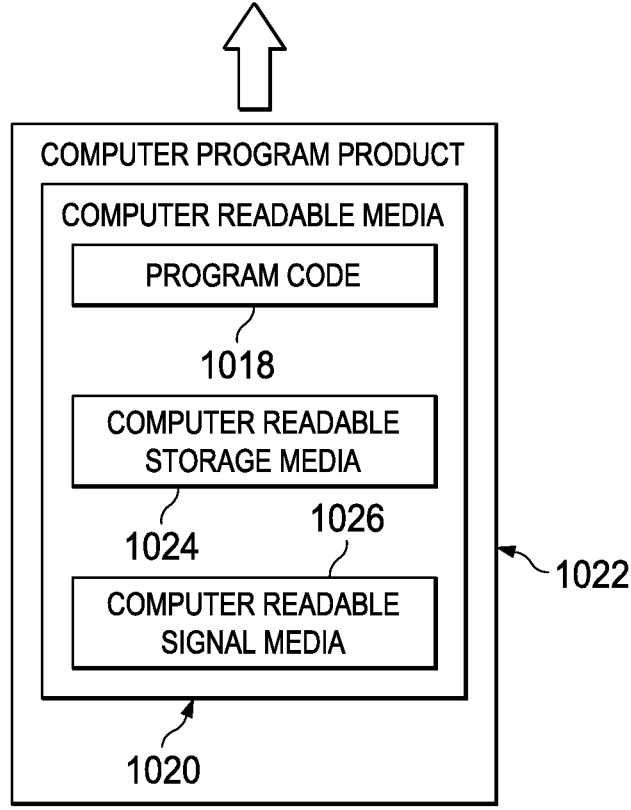

FOUR-DIMENSIONAL FLYABLE AREA DISPLAY SYSTEM FOR AIRCRAFT

BACKGROUND INFORMATION

1. Field:

The present disclosure relates generally to aircraft and, in particular, to displaying information used to operate aircraft. Still more particularly, the present disclosure relates to a method and apparatus for displaying flyable areas for an aircraft.

2. Background:

Information used to fly an aircraft may be displayed on a display system in the aircraft. This display system may be, for example, a navigation display or an electronic flight bag (EFB) display. An aeronautical chart showing terrain around the aircraft may be displayed on the navigation display.

Additionally, other information also may be displayed on the navigation display. This information may include, for example, without limitation, information about air traffic, flight paths of air traffic, and other suitable information.

The operator may use this information along with other information from other sources to operate the aircraft. For example, the operator may use fuel usage or estimates of fuel usage from a flight management system along with information about weather and traffic shown on the navigation display to determine whether sufficient reserve fuel is present to reach a target airport or whether the foreseen workload due to traffic is acceptable and manageable by the flight crew. If reserve fuel levels are not sufficient, the operator may use the navigation display to identify alternative airports that can be reached with a desired level of reserve fuel.

Further, the navigation display may also be used by the operator to identify weather conditions that may require changes to the flight plan for the aircraft. For example, weather conditions may make landing at a target airport in the flight plan unfeasible. As a result, the operator may use the navigation display along with the weather conditions on the display to identify an alternate airport for landing.

Further, the navigation display may also be used by the operator to identify areas where a reduced workload can be estimated for operating the aircraft as desired. For example, when one crew member is impaired, the remaining crew member needs to fly the aircraft to the next airport and may want to avoid flying through congested airspace.

In another example, when equipment in the aircraft does not operate as desired, the flight crew focuses their mental workload on assessing and addressing the current situation of the aircraft. In this case, the flight crew may also desire avoiding congested airspace.

Various conditions change dynamically during the flight of an aircraft. These conditions include, for example, without limitation, weather, traffic, flight paths of traffic, and other conditions. With these changes in conditions occurring during the flight of the aircraft, an operator of the aircraft uses the information from the navigation display and the flight management system to determine whether changes in the operation of the aircraft should occur. Identifying the changes in the conditions and determining whether changes in the operation of the aircraft should occur are tasks that require time and attention of the operator.

For example, with rapidly-changing weather conditions, identifying a desirable, safe route to a target airport may be more difficult than desired due to the need to process and manage various types of information about the environment around the aircraft. In other words, the operator monitors and makes calculations as to whether the target airport can be reached with the desired reserve fuel levels, or the operator identifies an alternative airport if the target airport cannot be reached. With dynamically-changing conditions, this may be more difficult or time-consuming than desired.

Therefore, it would be desirable to have a method and apparatus that takes into account at least some of the issues discussed above as well as possibly other issues.

SUMMARY

In one illustrative embodiment, a method for displaying information for an aircraft is present. Information is identified for the aircraft. An aeronautical chart is displayed on a display system. An envelope is displayed in the aeronautical chart based on the information. The envelope defines a space flyable by the aircraft that meets a number of objectives.

In another illustrative embodiment, a navigation system comprises a display system and a flight information identifier. The flight information identifier is configured to identify information for an aircraft. The flight information identifier is further configured to display an aeronautical chart on the display system. The flight information identifier is further configured to display an envelope in the aeronautical chart based on the information. The envelope defines a space flyable by the aircraft that meets a number of objectives.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives, and advantages thereof will best be understood by reference to the following detailed description of an illustrative embodiment of the present disclosure when read in conjunction with the accompanying drawings, wherein:

FIG. 10 is an illustration of a data processing system in accordance with an illustrative embodiment.

DETAILED DESCRIPTION

The illustrative embodiments recognize and take into account one or more different considerations. For example, the different illustrative embodiments recognize and take into account that currently, an operator may need to look at different sources for information to operate the aircraft. The different illustrative embodiments recognize and take into account that additional information may be displayed on a navigation display with the aeronautical charts to provide an operator of the aircraft additional situational awareness. The different illustrative embodiments recognize and take into account that by displaying more information on a navigation display, the operator does not need to look at as many displays, paper charts, or other sources in operating the aircraft.

The different illustrative embodiments recognize and take into account that the current manner in which information is displayed on a navigation display may not reduce the effort and time needed for the operator to make decisions regarding operation of the aircraft as much as desired. For example, the display of additional information may increase the clutter on the navigation display. This increase in clutter may make it more difficult for the operator to identify needed information for determining whether changes in the operation of the aircraft should occur.

Thus, one or more illustrative embodiments provide a method and apparatus for displaying information for an aircraft. In one illustrative embodiment, information associated with the aircraft is identified. An aeronautical chart is displayed on a display system. An envelope is displayed in the aeronautical chart based on the information identified. The envelope defines a space flyable by the aircraft that meets a number of objectives. As used herein, "a number of", when used with reference to items, means one or more items. For example, a number of objectives is one or more objectives.

The display of the envelope may be made in a number of different ways. In one illustrative example, information in an area outside of the envelope may be grayed or blacked out to indicate that that area is a non-flyable area or an area that does not meet the number of objectives. In other words, the areas that do not meet the number of objectives are not shown. The objectives may be areas that are unreachable or restricted.

Figure 1:
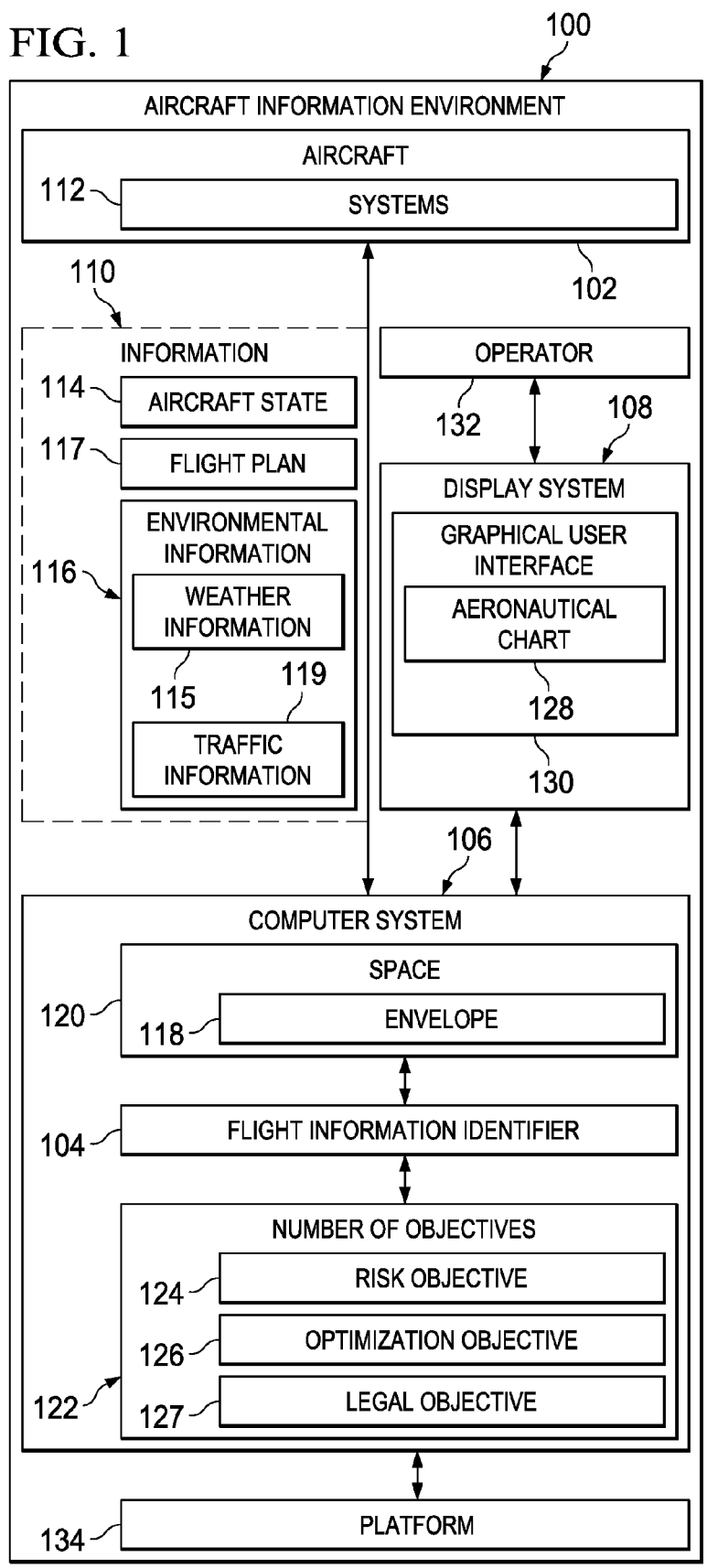
FIG. 1 is an illustration of a block diagram of an aircraft information environment in accordance with an illustrative embodiment.

Turning now to FIG. 1, an illustration of a block diagram of an aircraft information environment is depicted in accordance with an illustrative embodiment. As depicted, aircraft information environment 100 includes aircraft 102. Aircraft 102 may take various forms. For example, aircraft 102 may be, without limitation, an airplane, a helicopter, a commercial airplane, a private airplane, a military jet, or other suitable types of aircraft.

In these illustrative examples, flight information identifier 104 may be used to provide information to operate aircraft 102. In these illustrative examples, flight information identifier 104 may be implemented in software, hardware, or a combination of the two. When implemented in software, flight information identifier 104 may be embodied in program code that is run by a processor unit, such as a processor unit in computer system 106. Computer system 106 comprises a number of computers. When more than one computer is present, those computers may be in communication with each other through a communications system, such as a network.

Display system 108 is in communication with computer system 106. In these illustrative examples, display system 108 is hardware that is configured to display information. Display system 108 comprises a number of display devices.

In these illustrative examples, flight information identifier 104 may receive information 110 for aircraft 102. Information 110 may be received in systems 112 in aircraft 102. Systems 112 may include, for example, without limitation, at least one of an inertial measurement system, a global positioning system receiver, a flight management system, a sensor system, an electronic centralized aircraft monitor, an automatic dependent surveillance broadcast (ADS-B) system, and other suitable types of systems.

As used herein, the phrase "at least one of", when used with a list of items, means different combinations of one or more of the listed items may be used and only one of each item in the list may be needed. For example, "at least one of item A, item B, and item C" may include, without limitation, item A or item A and item B. This example also may include item A, item B, and item C, or item B and item C. In other examples, "at least one of" may be, for example, without limitation, two of item A, one of item B, and 10 of item C; four of item B and seven of item C; and other suitable combinations.

In these illustrative examples, information 110 for aircraft 102 may include at least one of information about aircraft 102, information that affects the operation of aircraft 102, and other suitable information that may be used to operate aircraft 102. In these illustrative examples, information 110 may be, for example, at least one of aircraft state 114, environmental information 116, flight plan 117, and other suitable types of information. In these illustrative examples, aircraft state 114 may include information, such as, for example, position, airspeed, fuel use, temperature, pressure, predicted fuel use, altitude, vertical speed, and other suitable types of information about aircraft 102.

Environmental information 116 may take a number of different forms. Environmental information 116 may include, for example, weather information 115 and traffic information 119. Weather information 115 in environmental information 116 may include at least one of temperature, precipitation, wind, turbulence, weather conditions, visibility, and other suitable information. Further, weather information 115 also may include projected information, such as, for example, without limitation, projected weather, projected precipitation, projected winds, and other suitable information.

Traffic information 119 may include at least one of locations of air traffic, commercial airways, and other suitable information. Further, traffic information 119 also may include, for example, projected positions for other aircraft for different times. This information may be information about aircraft 102 in its current position or along a flight path for aircraft 102 based on flight plan 117.

Flight plan 117 includes information about the flight of aircraft 102 from one location to another location. This information may include, for example, a route, segments making up the route, waypoints, predicted fuel use, altitude, airspeed, and other suitable information. Other suitable information may include, for example, legal restrictions, notices to airmen, airspace restrictions, such as no-fly zones, and the like.

In these illustrative examples, flight information identifier 104 uses information 110 for aircraft 102 to identify envelope 118 for aircraft 102. Envelope 118 is space 120 that may be flyable by aircraft 102 that meets number of objectives 122. In other words, envelope 118 is where aircraft 102 may fly in a manner that meets number of objectives 122. Space 120 may be two dimensional or three dimensional, depending on the particular implementation.

In these illustrative examples, number of objectives 122 may be various types of objectives, depending on the particular implementation. Number of objectives 122 may include at least one of risk objective 124, optimization objective 126, legal objective 127, and other types of objectives.

Risk objective 124 may be any objective relating to the amount of risk involved in the operation of aircraft 102. For example, risk objective 124 may be a requirement or constraint that aircraft 102 has a required level of fuel reserves to reach a target airport. In another illustrative example, risk objective 124 also may be avoiding turbulence that is greater than some desired level of turbulence for aircraft 102. As yet another example, risk objective 124 may be avoiding airspace in which a cloud of ash is present. Of course, other sets of risk objectives may be used for risk objective 124.

In still another illustrative example, risk objective 124 may be avoiding a projected flight path of another aircraft by some established amount of distance. Risk objective 124 also may include avoiding terrain by some established amount of distance.

Optimization objective 126 may also take a number of different forms. For example, optimization objective 126 may be to reach a target airport within a desired amount of time, fly with a desired fuel use rate, and other suitable objectives that may be optimizations for the operation of aircraft 102.

Legal objective 127 may be set by a government agency, such as the Federal Aviation Administration. An example of legal objective 127 may be an airspace restriction, a requirement to fly over designated waypoints, a no-fly zone, altitude restrictions, and other objectives.

In these illustrative examples, flight information identifier 104 displays aeronautical chart 128 on display system 108. Aeronautical chart 128 is a map that is used in navigating aircraft 102. In these illustrative examples, aeronautical chart 128 is information that is displayed on display system 108 rather than a paper chart. Aeronautical chart 128 may include information about items, such as, for example, without limitation, terrain elevations, airports, communications frequencies, navigation aids, rivers, cities, airspace boundaries, and other suitable information for use in navigating aircraft 102.

The display of aeronautical chart 128 may be based on the location of aircraft 102. Different aeronautical charts are displayed on display system 108, depending on the location and altitude of aircraft 102. In some illustrative examples, aeronautical chart 128 may be displayed as a "moving map" on display system 108.

In this illustrative example, aeronautical chart 128 is displayed on graphical user interface 130 in display system 108. In these illustrative examples, envelope 118 is displayed on aeronautical chart 128 as defining space 120 flyable by aircraft 102 that meets number of objectives 122.

As a result, operator 132 may obtain situational awareness information about aircraft 102 in a manner that allows aircraft 102 to meet or exceed number of objectives 122. The display of envelope 118 in aeronautical chart 128 may be used to reduce the amount of information that is displayed in aeronautical chart 128 for operator 132 to view. By reducing the information to an identification of space 120 flyable by aircraft 102, operator 132 may more easily make decisions about the operation of aircraft 102.

The reduction information may be, for example, leaving out information not needed by operator 132. For example, the information may be reduced by not showing or obscuring an area outside of envelope 118. Other information within envelope 118 would remain visible.

In other illustrative examples, the areas outside of envelope 118 may still be displayed. In this example, envelope 118 is displayed in a manner to draw attention to the area within envelope 118. As a result, the amount of information displayed may not be reduced, but an identification of information needed by operator 132 is made through the display of envelope 118.

In this manner, operator 132 may need to perform less calculations or analyses to operate aircraft 102. As a result, operator 132 may be less fatigued and may have more time to perform other tasks. Additionally, with the identification of space 120 flyable by aircraft 102, errors in calculations by operator 132 may be reduced.

For example, an operator may be optimistic about the range that an aircraft can fly. In one illustrative example, an operator may make calculations with results indicating that a target airport may be just out of fuel range. In some cases, the operator may be optimistic about how much fuel may actually be needed to reach the target airport and may still attempt to reach the target airport. In this instance, the aircraft may be out of fuel before reaching the target airport or may not have a desired amount of fuel reserves in case the aircraft encounters poor weather conditions.

When changes in information 110 occur during flight of aircraft 102, those changes may be taken into account by operator 132 more quickly than with currently used systems. In this manner, risk in the operation of aircraft 102 also may be reduced.

In these illustrative examples, flight information identifier 104 in computer system 106 may be located in aircraft 102 with operator 132 being a pilot or other suitable operator of aircraft 102. For example, flight information identifier 104 may be located in a flight management system, an electronic flight bag, or another suitable device in computer system 106.

In other illustrative examples, flight information identifier 104 may be located in platform 134. Platform 134 is in a location remote to aircraft 102. Platform 134 may be, for example, a building for an airline operations center, a building for an air traffic control service, or some other suitable platform. In other words, computer system 106 with flight information identifier 104 may be located at a ground location.

When flight information identifier 104 is located in aircraft 102 with operator 132 being a pilot, flight information identifier 104 may operate during some or all of the flight of aircraft 102 to provide information to operator 132 for use in operating aircraft 102. Further, in some cases, operator 132 may make projections or changes to flight plans or other parameters for aircraft 102 to determine whether envelope 118 changes with respect to the ability of aircraft 102 to meet number of objectives 122.

In other words, operator 132 may be able to use flight information identifier 104 to perform "what-if" scenarios. For example, operator 132 may change parameters, such as a selection of aircraft types for aircraft 102. The different types of aircraft may have different reserve fuel levels required for landing. Further, different types of aircraft also have different cost indexes. As a result, operator 132 may perform planning, which may include selecting a type of aircraft for aircraft 102.

Additionally, operator 132 may use flight information identifier 104 before flight of aircraft 102 in planning a flight plan for aircraft 102. In yet other illustrative examples, when platform 134 is a building at an airline operations center, operator 132 may provide instructions to aircraft 102. Further, the analysis of information may be performed for other aircraft in the fleet of aircraft for the airline during the flight of those aircraft. The analysis may be used to make changes in the operation of those aircraft as needed based on envelopes developed for those aircraft meeting desired objectives. Additionally, the airline may use information in a projected envelope to promote efficiency and maintain on-time departures and arrivals. In other words, an airline may use this information to slightly reroute an aircraft in the fleet to reach a desired destination on time.

The illustration of aircraft information environment 100 in FIG. 1 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

Although platform 134 has been described as a building for an airline operations center and a building for an air traffic control surface, platform 134 may take other forms. For example, platform 134 may be a ship, a spacecraft, or some other suitable type of platform.

Further, computer system 106 has been described as being located in aircraft 102 or in platform 134. In yet other illustrative examples, computer system 106 may be distributed between aircraft 102 and platform 134 in which computers in computer system 106 are in communication with each other. In some illustrative examples, computer system 106 may be located in platform 134, while display system 108 is located in aircraft 102.

Figure 2:
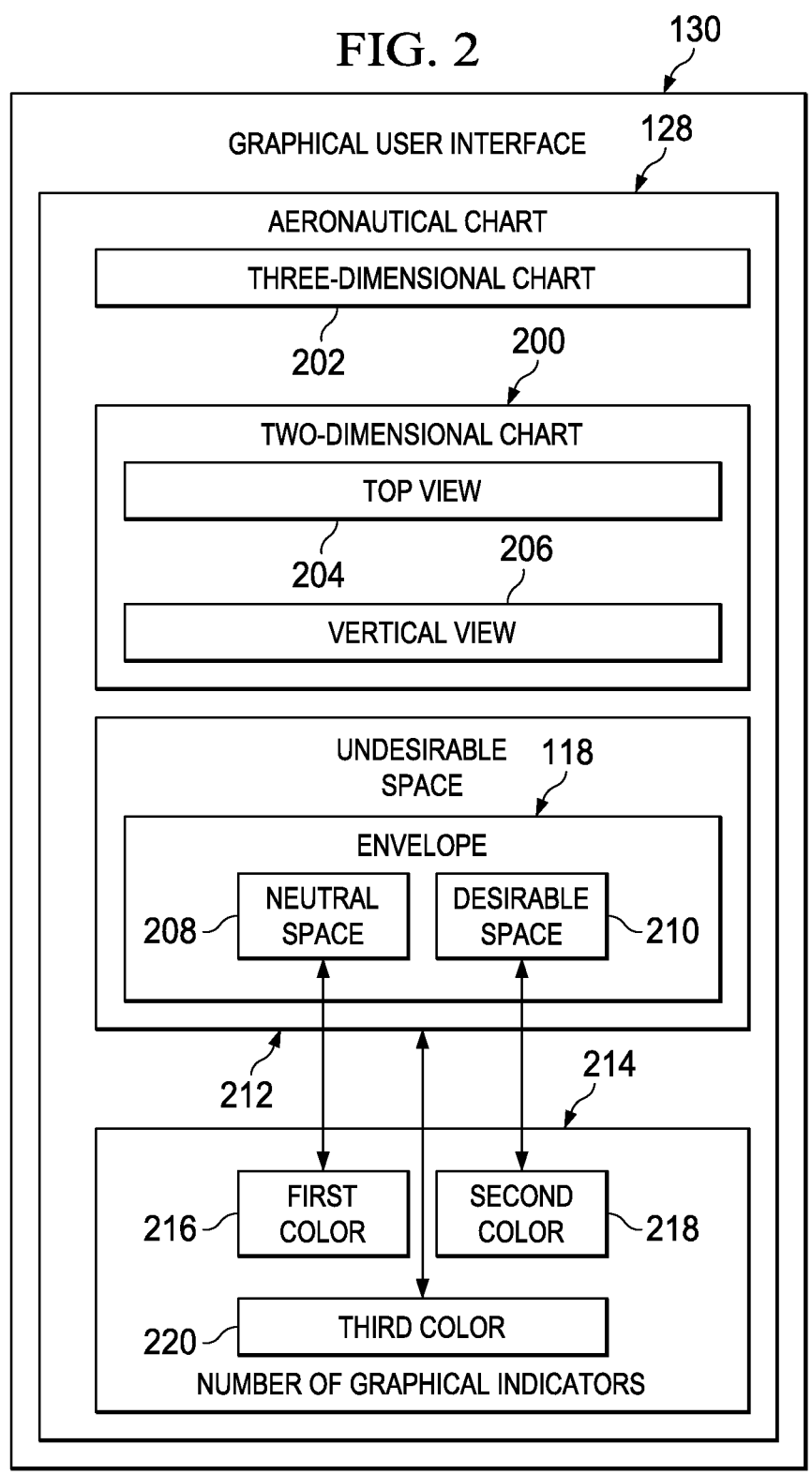
FIG. 2 is an illustration of a block diagram of a graphical user interface in accordance with an illustrative embodiment.

Turning now to FIG. 2, an illustration of a block diagram of a graphical user interface is depicted in accordance with an illustrative embodiment. In this depicted example, aeronautical chart 128 may be two-dimensional chart 200, three-dimensional chart 202, or some combination thereof.

Further, aeronautical chart 128, when taking the form of two-dimensional chart 200, may be displayed as top view 204, vertical view 206, or some combination thereof. Top view 204 is a view from the top of aircraft 102 in FIG. 1 to the ground. Vertical view 206 is a view in the direction that aircraft 102 travels. In particular, vertical view 206 may be a view from the surface of the Earth upward. Vertical view 206 may also be referred to as a vertical situational display.

In these illustrative examples, envelope 118 is displayed in graphical user interface 130 in aeronautical chart 128. As depicted, envelope 118 defines a space in which aircraft 102 is able to meet number of objectives 122 in FIG. 1. For example, if number of objectives 122 is a range based on a desired level of fuel reserves, envelope 118 illustrates space in which aircraft 102 may fly and meet that objective.

As depicted, envelope 118 may include neutral space 208 and desirable space 210. Neutral space 208 is any space that aircraft 102 may fly to meet number of objectives 122.

Additionally, desirable space 210 may be any space within envelope 118 that aircraft 102 may fly that may exceed number of objectives 122 by some threshold. For example, desirable space 210 may be areas where tailwinds are present. Flying in desirable space 210 with tailwinds may increase fuel efficiency to a level greater than required to meet an objective for fuel efficiency by some threshold. The threshold may be selected in different ways, depending on the implementation. For example, the threshold may be a numerical value, a percentage, a function that calculates a value, or some other suitable form.

Additionally, space outside of envelope 118 is undesirable space 212 in these illustrative examples. Undesirable space 212 is space in which aircraft 102 should avoid during flight.

In these illustrative examples, neutral space 208, desirable space 210, envelope 118, and undesirable space 212 may be identified in aeronautical chart 128 using number of graphical indicators 214. Number of graphical indicators 214 may take various forms. For example, without limitation, number of graphical indicators 214 may be at least one of a line, color, shading, cross-hatching, graphic, text, animated graphics, and other suitable types of graphical indicators.

For example, envelope 118 may be defined using a line. Neutral space 208 within envelope 118 may be defined using first color 216, desirable space 210 may be defined using second color 218, and undesirable space 212 may be defined using third color 220.

For example, first color 216 may be blue, and second color 218 may be green. Third color 220 may be selected to obscure or block out a view of terrain or other information on aeronautical chart 128 that is outside of envelope 118. In one illustrative example, third color 220 may be black or gray.

In these illustrative examples, envelope 118 may change dynamically as information 110 in FIG. 1 changes. As a result, operator 132 does not need to perform new calculations each time information 110 changes in operating aircraft 102. Instead, operator 132 may view envelope 118 displayed in aeronautical chart 128 to more quickly make decisions on operating aircraft 102.

The illustration of graphical user interface 130 in FIG. 2 is not meant to imply physical or architectural limitations to the manner in which graphical user interface 130 may display information. For example, although neutral space 208, desirable space 210, and undesirable space 212 have been described as being displayed using colors, other types of graphical indicators may be used in addition to or in place of color. For example, undesirable space 212 may be displayed using third color 220 and cross-hatching. Desirable space 210 may be displayed using second color 218 in which intensity of second color 218 alternates in a flashing manner.

In other illustrative examples, shading may be used in a particular color to indicate certain sections within a space. For example, a lighter shade of first color 216 may be used to show when the aircraft is in a space close to undesirable space 212 or a particular condition, such as rain, has begun in a section of neutral space 208. In this illustrative example, aircraft 102 may still be able to fly through this section of neutral space 208, but considerations must be made for the change in weather condition.

In still other illustrative examples, envelope 118 may not distinguish between different types of space. For example, envelope 118 may only have neutral space 208. In still other illustrative examples, one or more desirable space in addition to desirable space 210 may be displayed.

These additional desirable spaces may be of different types than desirable space 210. For example, desirable space 210 may indicate a desirable space in which tailwinds are present for increased fuel efficiency. Another desirable space may be present that indicates a lack of turbulence for increased comfort of passengers. When more than one type of desirable space is present, these spaces may overlap each other. This overlap may be indicated with additional graphical indicators to indicate the overlap. For example, flashing colors, animation, or graphical indicators may be used to show the area of overlap may provide an increased ability to meet or exceed number of objectives 122.

Figure 3:
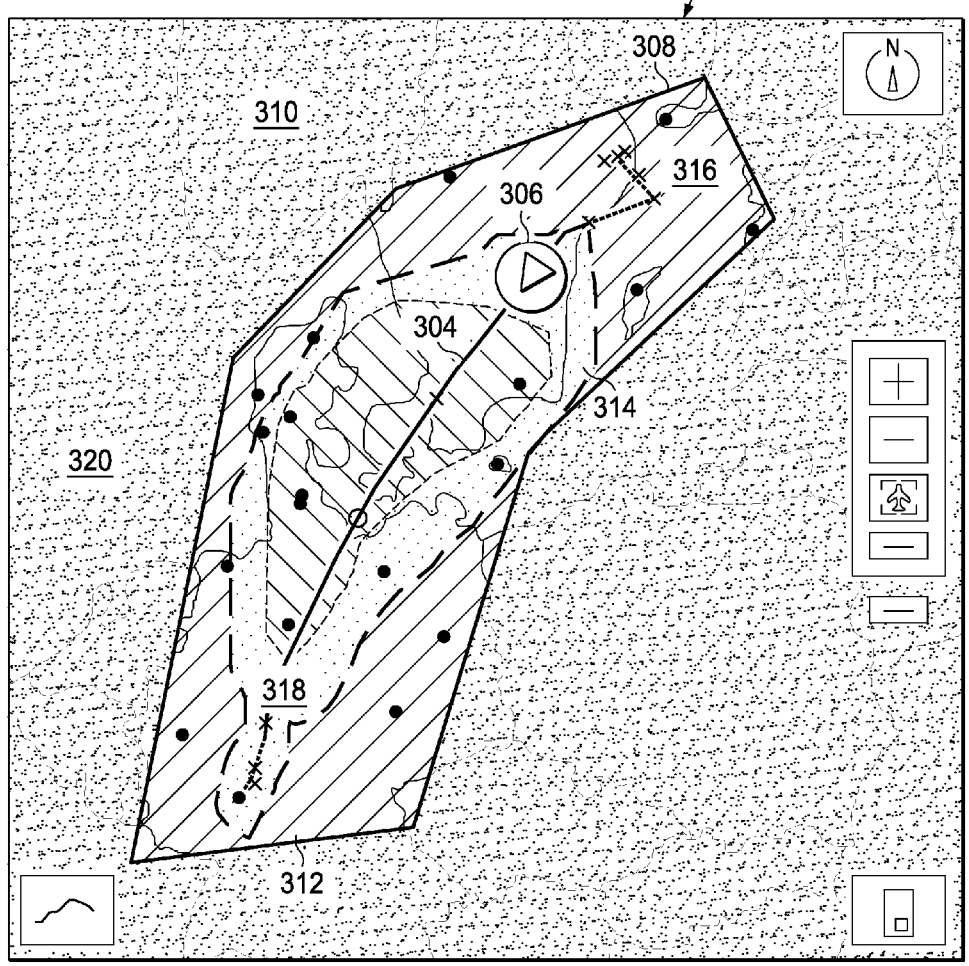
FIG. 3 is an illustration of an envelope displayed in an aeronautical chart in a graphical user interface in accordance with an illustrative embodiment.

With reference now to FIG. 3, an illustration of an envelope displayed in an aeronautical chart in a graphical user interface is depicted in accordance with an illustrative embodiment. In this illustrative example, graphical user interface 300 is an example of an implementation for graphical user interface 130 displayed in display system 108 in FIG. 1. Aeronautical chart 302 is displayed in graphical user interface 300. In this illustrative example, aeronautical chart 302 is a moving map.

As depicted, route 304 for an aircraft is displayed on aeronautical chart 302. Icon 306 is displayed on aeronautical chart 302 in a location corresponding to a location of the aircraft.

Envelope 308 is displayed in aeronautical chart 302. In this two-dimensional display, undesirable space 310 is an area outside of envelope 308 and is obscured in this illustrative example. In this illustrative example, envelope 308 is displayed using first color 312 and second color 314. First color 312 identifies neutral space 316 in envelope 308.

Neutral space 316 in envelope 308 is an area in which a number of objectives can be met. Second color 314 identifies desirable space 318 in envelope 308. Desirable space 318 identified by second color 314 is an area in which a number of objectives can be met or exceeded by the aircraft flying through desirable space 318. In this illustrative example, desirable space 318 is an area in which tailwinds are present. When the aircraft flies through desirable space 318 in envelope 308, the aircraft may reach a target airport more quickly and may be able to fly with greater fuel efficiency.

In this illustrative example, undesirable space 310 is displayed using third color 320. In this illustrative example, third color 320 may be selected to obscure information in undesirable space 310 on aeronautical chart 302. In other words, undesirable space 310 may be blacked out or obscured from the view of the operator. Of course, an operator may change the color or remove the color to see information in undesirable space 310, depending on the particular implementation.

Figure 4:
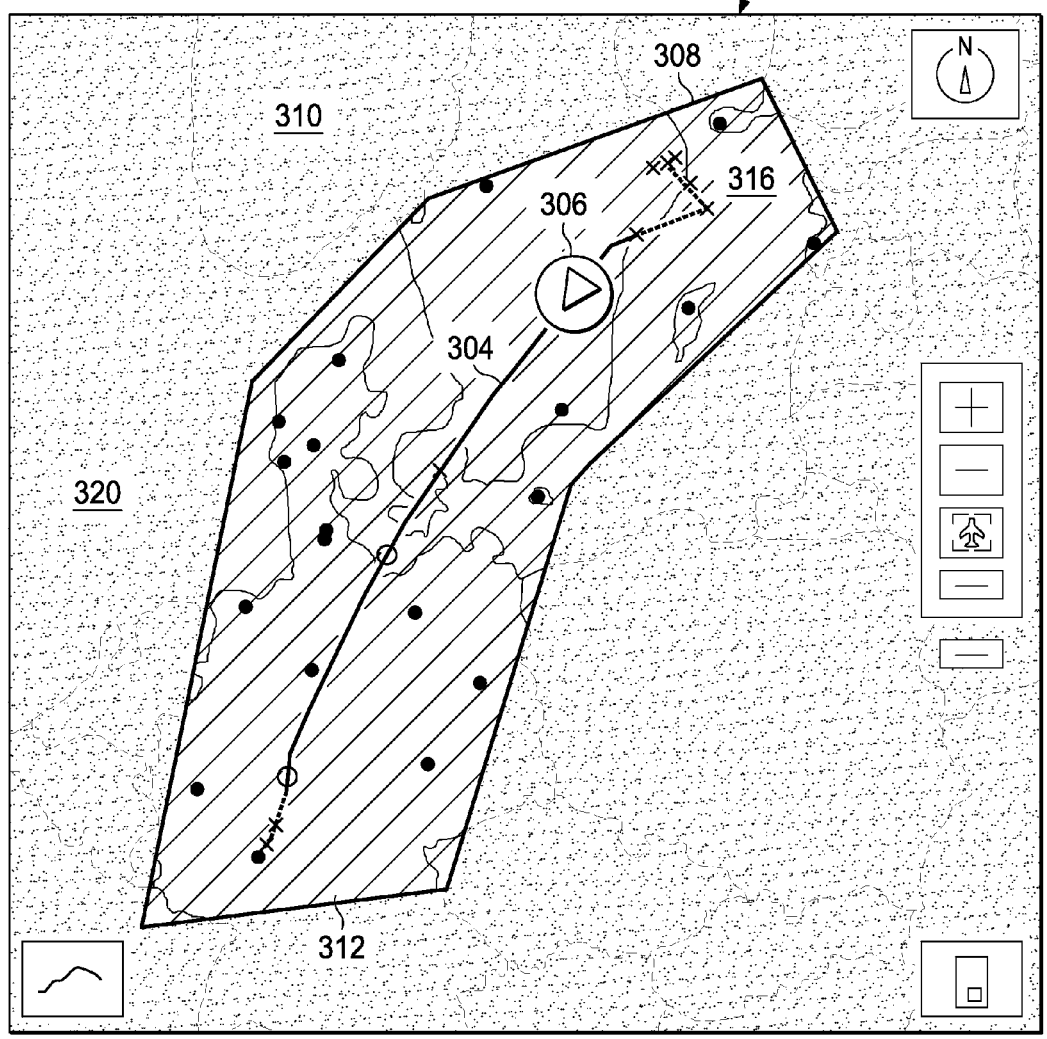
FIG. 4 is another illustration of an envelope displayed in an aeronautical chart in a graphical user interface in accordance with an illustrative embodiment.

With reference now to FIG. 4, another illustration of an envelope displayed in an aeronautical chart in a graphical user interface is depicted in accordance with an illustrative embodiment. In this example, desirable space 318 is no longer displayed within envelope 308. In this example, only neutral space 316 is present. This change in the display of envelope 308 may occur in response to a change in information. For example, when desirable space 318 in FIG. 3 represents a presence of tailwinds, if tailwinds change or are no longer present during the operation of the aircraft, desirable space 318 is no longer displayed within envelope 308.

Figure 5:
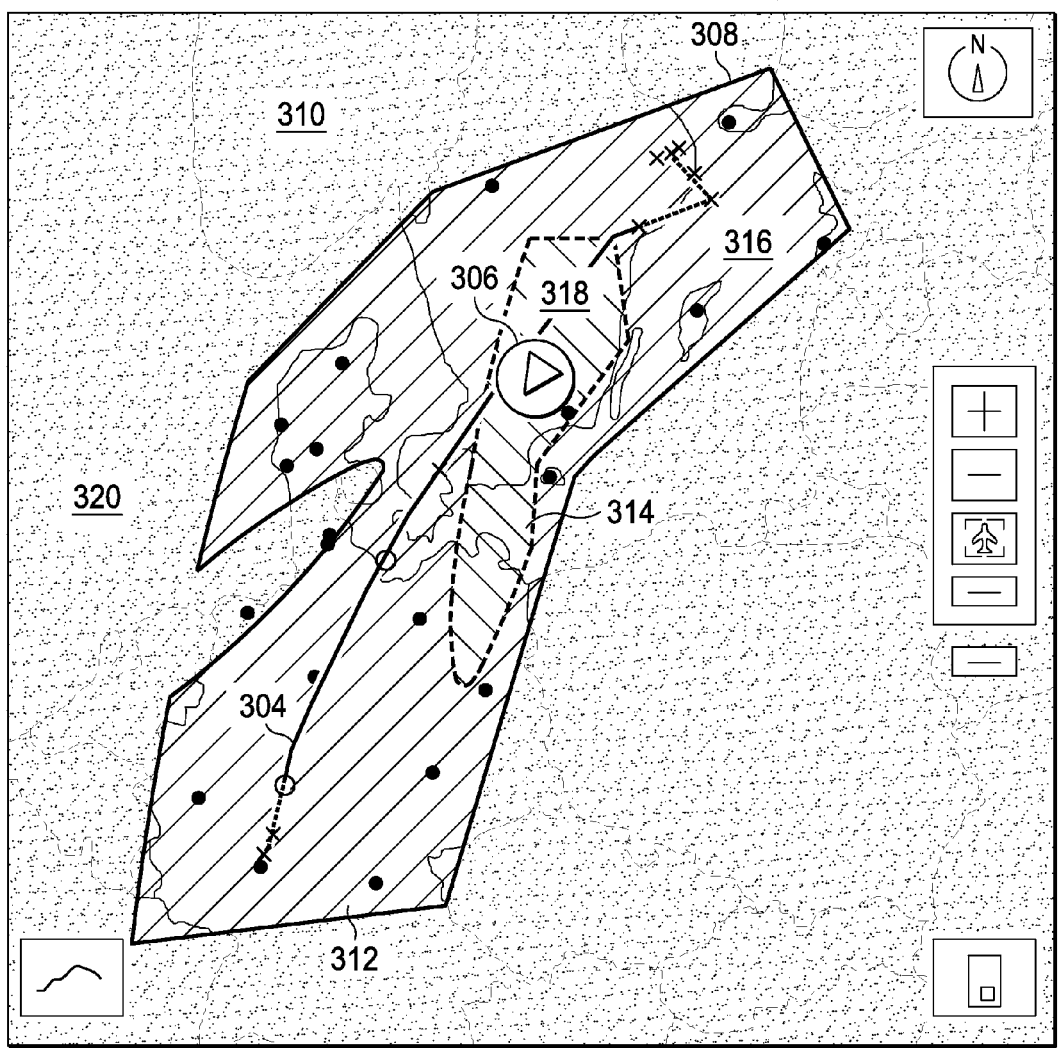
FIG. 5 is yet another illustration of an envelope displayed in an aeronautical chart in a graphical user interface in accordance with an illustrative embodiment.

Turning now to FIG. 5, yet another illustration of an envelope displayed in an aeronautical chart in a graphical user interface is depicted in accordance with an illustrative embodiment. In this illustrative example, information for the aircraft has changed during the flight of the aircraft.

In this particular example, the change in information results in a change in the shape of envelope 308. Further, desirable space 318 also has changed in shape and location as compared to the illustration of envelope 308 in FIGS. 3 and 4.

In this manner, changes in information that affect the flight of the aircraft result in changes in the display of envelope 308. Further, the illustration of envelope 308 in FIGS. 3-5 is not meant to imply physical or architectural limitations to the manner in which an illustrative embodiment may be implemented. In these illustrative examples, envelope 308 is displayed as a flight envelope. In other words, envelope 308 illustrates flyable space for an aircraft based on route 304 in a flight plan for the aircraft. In other illustrative examples, envelope 308 may be displayed as a range envelope. In this example, envelope 308 may be displayed to indicate areas flyable by the aircraft without regard to a particular route or flight plan.

Figure 6:
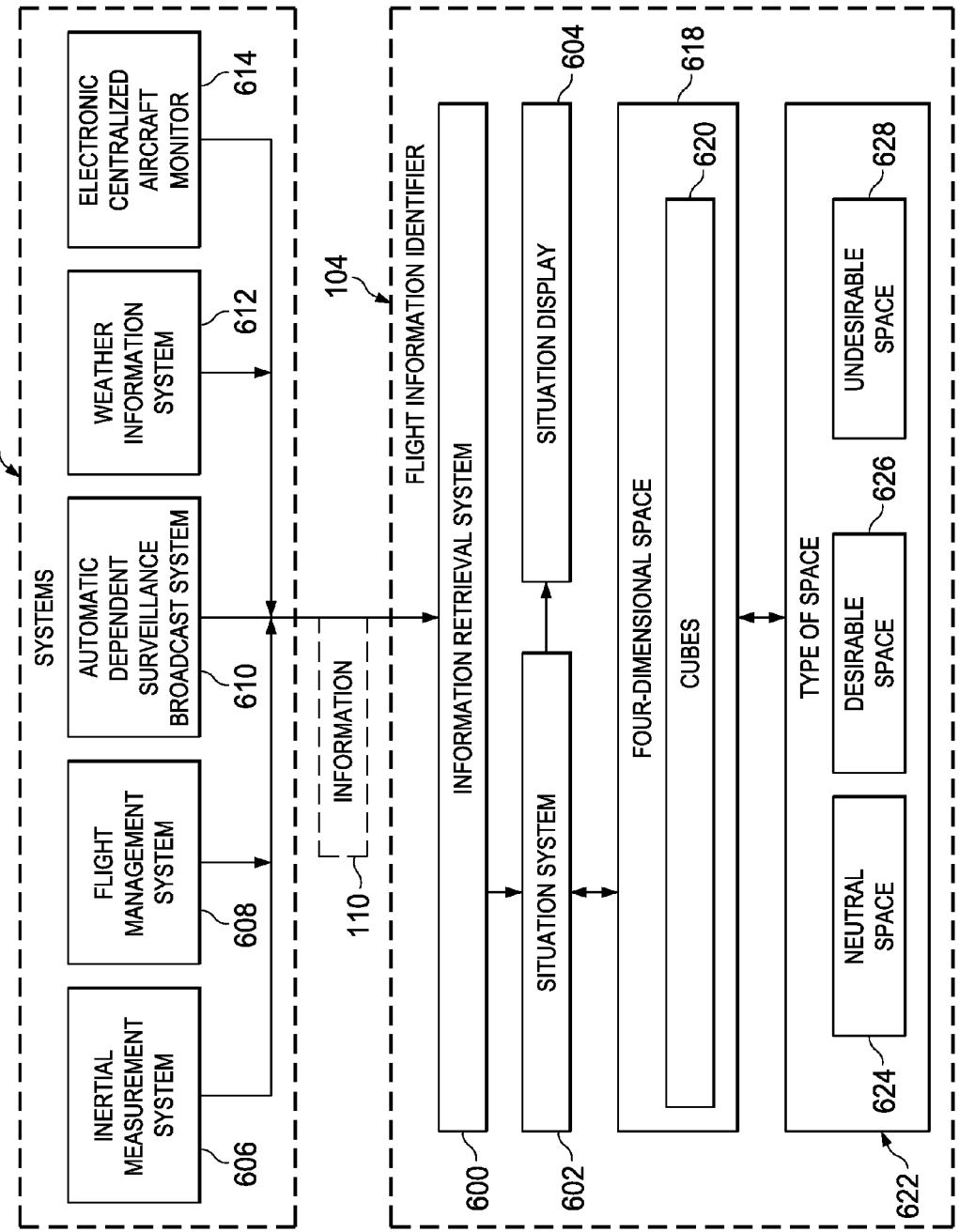
FIG. 6 is an illustration of a block diagram of a flight information identifier in accordance with an illustrative embodiment.

With reference now to FIG. 6, an illustration of a block diagram of flight information identifier 104 is depicted in accordance with an illustrative embodiment. As depicted, flight information identifier 104 comprises information retrieval system 600, situation system 602, and situation display 604.

In these illustrative examples, systems 112 in aircraft 102 in FIG. 1 comprise automatic dependent surveillance broadcast (ADS-B) system 610, weather information system 612, and electronic centralized aircraft monitor (ECAM) 614. Of course, systems 112 may include other systems in addition to or in place of the ones illustrated in this particular example.

As depicted, inertial measurement system 606 may generate information, such as position, speed, altitude, and other information for aircraft state 114 in FIG. 1 in information 110. Flight management system 608 may provide flight plan 117, a cost index, and other suitable information for aircraft state 114 for aircraft 102. Automatic dependent surveillance broadcast system 610 may provide information, such as aircraft traffic, traffic intent, predicted aircraft traffic, and other suitable information.

Weather information system 612 may provide current weather information as well as predicted or forecasted weather information. Electronic centralized aircraft monitor 614 may provide information, such as, for example, current fuel use, predicted fuel use, and other information.

Information retrieval system 600 is configured to obtain information 110 from systems 112 in these depicted examples. Information retrieval system 600 is configured to retrieve and process information 110. In these illustrative examples, information 110 received from systems 112 may be time-tagged. In other words, information 110 may include timestamps. Information retrieval system 600 correlates the information based on the timestamps.

Further, when predicted information is unavailable, information retrieval system 600 also may provide predictions for various types of information. For example, if electronic centralized aircraft monitor 614 does not provide an estimated fuel use, information retrieval system 600 may predict fuel use based on past information about current fuel use.

Further, information retrieval system 600 places information 110 in a format useable by situation system 602. For example, information retrieval system 600 may use a format with five fields. These fields may be system, time, variable, and projected error. The system identifies a system in systems 112 from which the information in information 110 was received. Time represents the time at which the information in information 110 was received from the system identified. The variable identifies the parameter. The value is the value of the parameter. Projected error is the estimated error for the value.

For example, information received from inertial measurement system 606 may be as follows: INS, 17:00:00, ALT, 7500 m, and 20 m. In this example, INS represents inertial measurement system 606. 17:00:00 is the timestamp for the information. ALT represents altitude. 7500 m is the altitude identified, and 20 m is the projected error for the value. Of course, other numbers and types of fields may be used, depending on the particular implementation.

Situation system 602 is configured to identify envelope 118 based on number of objectives 122 selected for aircraft 102 in FIG. 1. In particular, situation system 602 may represent the space around aircraft 102 as four-dimensional space 618. Four-dimensional space 618 is a data structure that identifies space 120 in FIG. 1 in which aircraft 102 may fly at different points in time. In these illustrative examples, four-dimensional space 618 may be the shape of a cube. In this example, four-dimensional space 618 may take the form of a four-dimensional cube.

In these illustrative examples, four-dimensional space 618 may be divided into cubes 620. Each cube in cubes 620 may be marked in a manner that defines envelope 118. For example, each cube in cubes 620 may be marked to indicate type of space 622. Type of space 622 may be, for example, selected from one of neutral space 624, desirable space 626, undesirable space 628, or as some other suitable type of space. Type of space 622 for cubes 620 may be marked based on whether an objective in number of objectives 122 can be met by aircraft 102 flying within a particular cube in cubes 620.

Type of space 622 for cubes 620 also may be marked based on whether an objective in number of objectives 122 can be exceeded by some threshold. Cubes 620 that meet the objective but do not exceed the objective by some threshold are marked as neutral space. Cubes 620 that exceed the number of objectives by the threshold are marked as desirable space.

If any objective cannot be met in number of objectives 122, the cube may then be marked as undesirable. The use of neutral space, desirable space, and undesirable space may be suited for when flight information identifier 104 is used in aircraft 102 by operator 132 in FIG. 1. In this manner, clutter or too much information may be avoided in displaying envelope 118 to operator 132.

Of course, a higher granularity may be present for cubes 620, depending on the particular implementation. For example, particular types of objectives that are met or exceeded by a threshold may be identified for different points in time. This increased amount of information may be suitable for when flight information identifier 104 is used on platform 134 in FIG. 1. Situation display 604 is configured to generate graphical user interface 130 with envelope 118 displayed in aeronautical chart 128 in FIG. 1. Aeronautical chart 128 may be displayed in two-dimensions or three-dimensions.

Figure 7:
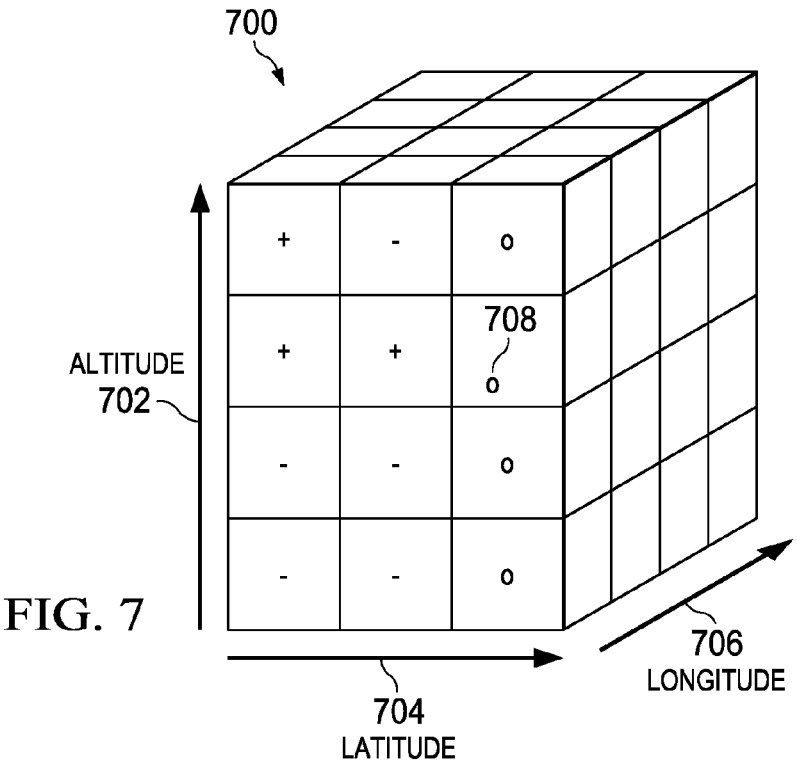
FIG. 7 is an illustration of cubes in a four-dimensional space in accordance with an illustrative embodiment.

With reference now to FIG. 7, an illustration of cubes in a four-dimensional space is depicted in accordance with an illustrative embodiment. In this illustrative example, cubes 700 are shown as a pictorial illustration of cubes 620 for four-dimensional space 618 in FIG. 6.

In this illustrative example, axis 702 represents altitude, axis 704 represents latitude, and axis 706 represents longitude. Each of cubes 700 contains an indication of whether the space in a particular cube is a neutral space, a desirable space, or an undesirable space. In these illustrative examples, the indication is made for different points in time. For example, cube 708 may include an indication that this space is a neutral space at one point in time but is an undesirable space in another point in time. As a result, the state of the cube may change over time.

Of course, in other illustrative examples, each cube may include more-detailed information for different points in time. For example, cube 708 may identify levels of traffic for different points in time in addition to whether the space is neutral, desirable, or undesirable.

Figure 8:
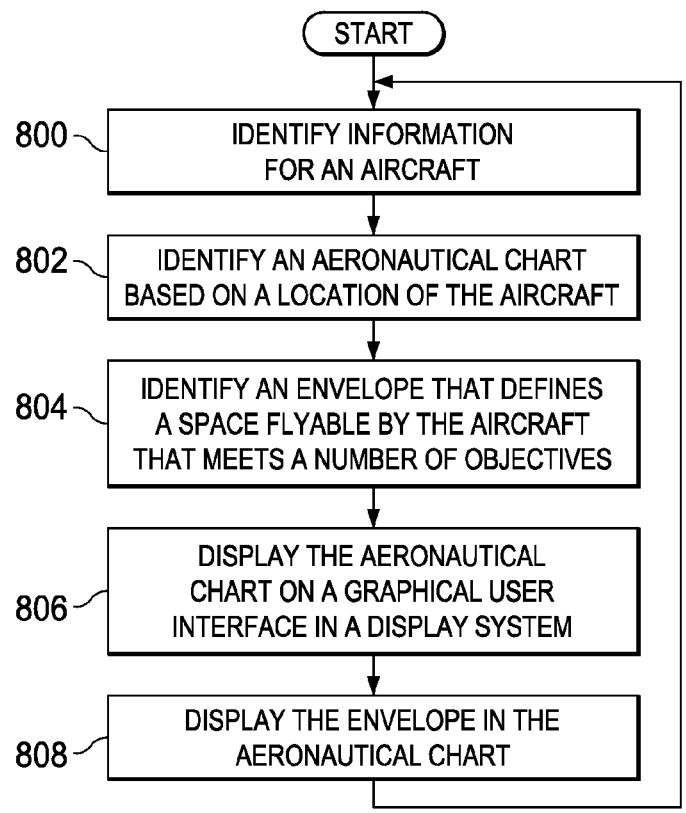
FIG. 8 is an illustration of a flowchart of a process for displaying information for an aircraft in accordance with an illustrative embodiment.

With reference now to FIG. 8, an illustration of a flowchart of a process for displaying information for an aircraft is depicted in accordance with an illustrative embodiment. The process illustrated in FIG. 8 may be used in aircraft information environment 100 in FIG. 1. In particular, the process may be implemented in flight information identifier 104 in FIG. 1. This process may be implemented in hardware, software, or a combination of the two.

The process begins by identifying information for an aircraft (operation 800). The process then identifies an aeronautical chart based on a location of the aircraft (operation 802).

The process then identifies an envelope that defines a flyable by the aircraft that meets a number of objectives (operation 804). In operation 804, the envelope may be identified using a four-dimensional cube. In one illustrative example, the plurality of cubes may be marked with an indication of a type of space based on the information identified for the aircraft.

The aeronautical chart is displayed on a graphical user interface in a display system (operation 806). The envelope is displayed in the aeronautical chart (operation 808), with the process then returning to operation 800. In operation 808, the envelope may be displayed using the four-dimensional cube with the type of space marked for the plurality of cubes in the four-dimensional cube. Further, the envelope may be displayed by obscuring or blacking out the areas of the aeronautical chart that are outside of the envelope. In this manner, information areas in which the aircraft should not operate are not shown for consideration by the operator. Of course, the operator may opt to see the information if desired. By returning to operation 800, the process may identify changes to information for the aircraft and update the envelope as needed.

This process may be implemented in an aircraft during operation of the aircraft. Further, the process also may be used by an operator at a platform that is remote to the aircraft while the aircraft is flying. In still other illustrative examples, the process may be used for planning purposes prior to the flight of the aircraft. Although information may change during actual flight, performing "what-if" scenarios during a planning process may be useful for selecting types of aircraft for use or for selecting routes and other items.

Figure 9:
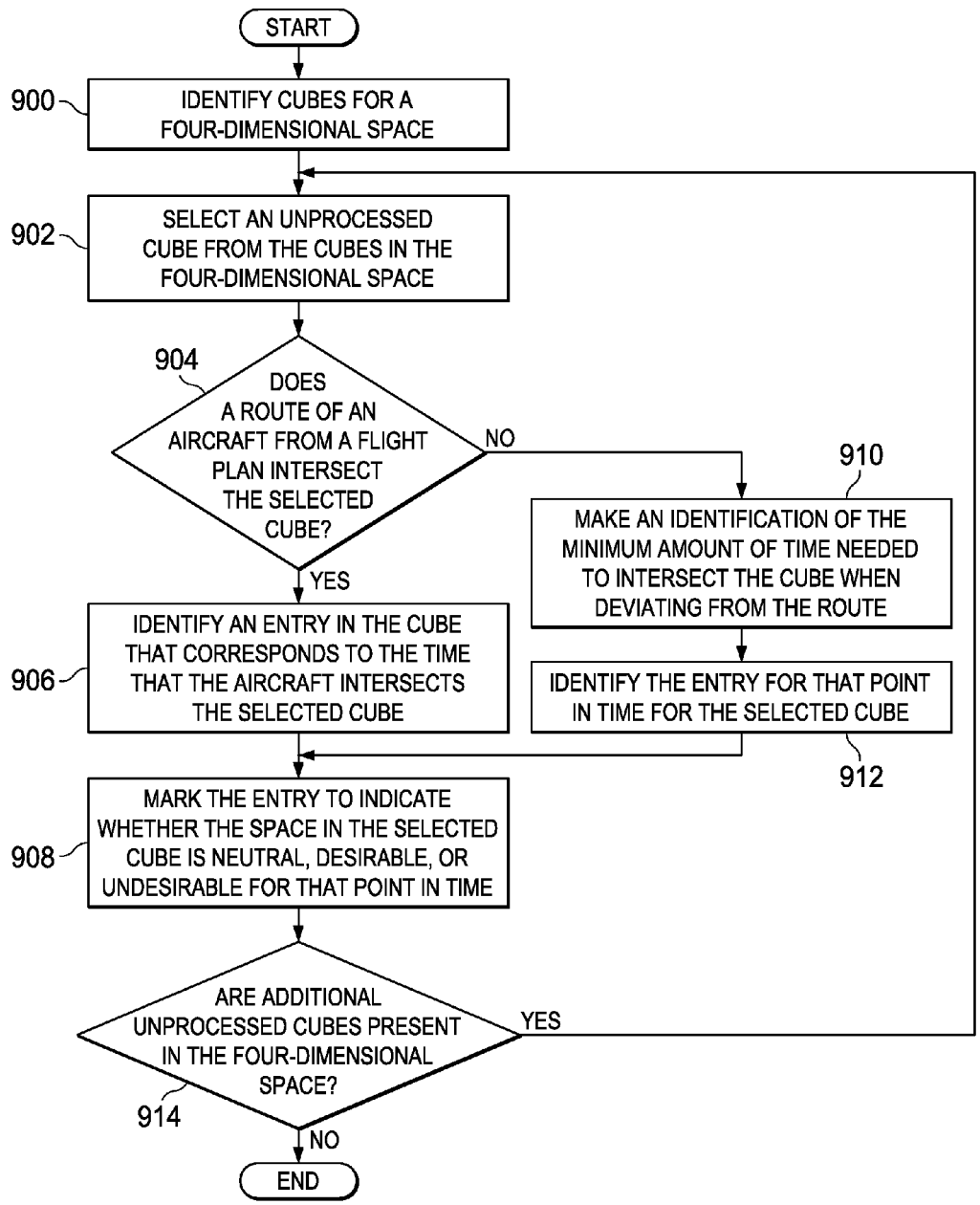
FIG. 9 is an illustration of a flowchart of a process for processing information for an aircraft to identify an envelope in accordance with an illustrative embodiment.

Turning now to FIG. 9, an illustration of a flowchart of a process for processing information for an aircraft to identify an envelope is depicted in accordance with an illustrative embodiment. This process may be implemented in flight information identifier 104 in FIG. 1 and, in particular, in situation system 602 in flight information identifier 104 in FIG. 6.

The process begins by identifying cubes for a four-dimensional space (operation 900). The four-dimensional space may be selected in a number of different ways. For example, the four-dimensional space may be a space around a route for a flight plan of an aircraft. In another illustrative example, the four-dimensional space may be a selected distance from the current location of the aircraft. The cubes in the four-dimensional space may have different sizes, depending on the particular implementation.

The process selects an unprocessed cube from the cubes in the four-dimensional space (operation 902). Each cube may have a plurality of entries in which each entry corresponds to a different point in time. A determination is made as to whether a route of an aircraft from a flight plan intersects the selected cube (operation 904).

If the route intersects the selected cube, an entry in the cube that corresponds to the time that the aircraft intersects the selected cube is identified (operation 906). The process then marks the entry to indicate whether the space in the selected cube is neutral, desirable, or undesirable for that point in time (operation 908).

With reference again to operation 904, if the route does not intersect the selected cube, an identification of the minimum amount of time needed to intersect the cube when deviating from the route is made (operation 910). The entry for that point in time is identified for the selected cube (operation 912). The process then proceeds to operation 908 as described above.

Thereafter, a determination is made as to whether additional unprocessed cubes are present in the four-dimensional space (operation 914). If additional unprocessed cubes are present, the process returns to operation 902. Otherwise, the process terminates.

Turning now to FIG. 10, an illustration of a data processing system is depicted in accordance with an illustrative embodiment. Data processing system 1000 may be used to implement one or more computers in computer system 106 in aircraft information environment 100 in FIG. 1. In this illustrative example, data processing system 1000 includes communications framework 1002, which provides communications between processor unit 1004, memory 1006, persistent storage 1008, communications unit 1010, input/output (I/O) unit 1012, and display 1014. In this example, communications framework 1002 may take the form of a bus system.

Processor unit 1004 serves to execute instructions for software that may be loaded into memory 1006. Processor unit 1004 may be a number of processors, a multi-processor core, or some other type of processor, depending on the particular implementation.

Memory 1006 and persistent storage 1008 are examples of storage devices 1016. A storage device is any piece of hardware that is capable of storing information, such as, for example, without limitation, data, program code in functional form, and/or other suitable information either on a temporary basis and/or a permanent basis. Storage devices 1016 may also be referred to as computer readable storage devices in these illustrative examples. Memory 1006, in these examples, may be, for example, a random access memory or any other suitable volatile or non-volatile storage device. Persistent storage 1008 may take various forms, depending on the particular implementation.

For example, persistent storage 1008 may contain one or more components or devices. For example, persistent storage 1008 may be a hard drive, a flash memory, a rewritable optical disk, a rewritable magnetic tape, or some combination of the above. The media used by persistent storage 1008 also may be removable. For example, a removable hard drive may be used for persistent storage 1008.

Communications unit 1010, in these illustrative examples, provides for communications with other data processing systems or devices. In these illustrative examples, communications unit 1010 is a network interface card.

Input/output unit 1012 allows for input and output of data with other devices that may be connected to data processing system 1000. For example, input/output unit 1012 may provide a connection for user input through a keyboard, a mouse, and/or some other suitable input device. Further, input/output unit 1012 may send output to a printer. Display 1014 provides a mechanism to display information to a user.

Instructions for the operating system, applications, and/or programs may be located in storage devices 1016, which are in communication with processor unit 1004 through communications framework 1002. The processes of the different embodiments may be performed by processor unit 1004 using computer-implemented instructions, which may be located in a memory, such as memory 1006.

These instructions are referred to as program code, computer usable program code, or computer readable program code that may be read and executed by a processor in processor unit 1004. The program code in the different embodiments may be embodied on different physical or computer readable storage media, such as memory 1006 or persistent storage 1008.

Program code 1018 is located in a functional form on computer readable media 1020 that is selectively removable and may be loaded onto or transferred to data processing system 1000 for execution by processor unit 1004. Program code 1018 and computer readable media 1020 form computer program product 1022 in these illustrative examples. In one example, computer readable media 1020 may be computer readable storage media 1024 or computer readable signal media 1026.

In these illustrative examples, computer readable storage media 1024 is a physical or tangible storage device used to store program code 1018 rather than a medium that propagates or transmits program code 1018.

Alternatively, program code 1018 may be transferred to data processing system 1000 using computer readable signal media 1026. Computer readable signal media 1026 may be, for example, a propagated data signal containing program code 1018. For example, computer readable signal media 1026 may be an electromagnetic signal, an optical signal, and/or any other suitable type of signal. These signals may be transmitted over communications links, such as wireless communications links, optical fiber cable, coaxial cable, a wire, and/or any other suitable type of communications link.

The different components illustrated for data processing system 1000 are not meant to provide architectural limitations to the manner in which different embodiments may be implemented. The different illustrative embodiments may be implemented in a data processing system including components in addition to and/or in place of those illustrated for data processing system 1000. Other components shown in FIG. 10 can be varied from the illustrative examples shown. The different embodiments may be implemented using any hardware device or system capable of running program code 1018.

Thus, one or more of the different illustrative embodiments provide a method and apparatus for displaying information for operating an aircraft. In particular, one or more illustrative embodiments may display an envelope on an aeronautical chart on a display system. The envelope identifies a space in which the aircraft may fly that meets a number of objectives.

These objectives may include risk objectives, performance objectives, optimization objectives, and other suitable types of objectives. With the use of one or more illustrative embodiments, the display of the envelope may reduce the need for an operator of an aircraft to consult numerous different sources of information to operate the aircraft. For example, an operator may avoid looking at paper charts, an electronic flight bag, and other sources to determine where the aircraft may fly to meet an objective.

Further, with one or more illustrative embodiments, clutter from too much information being displayed also may be avoided. The use of the envelope may allow an operator to quickly identify the space in which an aircraft may fly. This may be in contrast to the display of weather reports, aircraft state information, or other information on an aeronautical chart on a navigation display. As a result, an operator does not need to find and analyze information to determine where an aircraft may fly.

The description of the different illustrative embodiments has been presented for purposes of illustration and description and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for displaying information for an aircraft, the method comprising:
identifying the information for the aircraft;
displaying an aeronautical chart on a display system; and
displaying an envelope in the aeronautical chart based on the information, wherein the envelope defines a space flyable by the aircraft that meets a number of objectives.

2. The method of claim 1, wherein the envelope is displayed in one of two dimensions and three dimensions.

3. The method of claim 1 further comprising:
displaying an indication of undesirable space outside of the envelope.

4. The method of claim 3, wherein the indication of undesirable space is a graphical indicator that obscures a portion of the aeronautical chart outside of the envelope.

5. The method of claim 1 further comprising:
displaying an indication of desired space within the envelope.

6. The method of claim 1 further comprising:
repeating displaying the envelope in the aeronautical chart based on the information in response to the information changing, wherein the envelope defines the space flyable by the aircraft that meets the number of objectives.

7. The method of claim 1, wherein the aeronautical chart is selected from at least one of a vertical view and a top view.

8. The method of claim 1, wherein the information for the aircraft is selected from at least one of an aircraft state, environmental information, and a flight plan.

9. The method of claim 1, wherein identifying the information associated with the aircraft; displaying the aeronautical chart; and displaying the envelope in the aeronautical chart based on the information, wherein the envelope defines the space flyable by the aircraft that meets the number of objectives is performed in a computer system in the aircraft.

10. The method of claim 1, wherein identifying the information associated with the aircraft; displaying the aeronautical chart; and displaying the envelope in the aeronautical chart based on the information, wherein the envelope defines the space flyable by the aircraft that meets the number of objectives is performed in a computer system at a ground location.

11. The method of claim 1, wherein the number of objectives comprises at least one of a risk objective, an optimization objective, and a legal objective.

12. The method of claim 1 further comprising:
generating a four-dimensional cube comprised of a plurality of cubes; and
marking the plurality of cubes with an indication of a type of space based on the information,
wherein, the step of displaying the envelope comprises:
displaying the envelope using the four-dimensional cube with the type of space marked for the plurality of cubes in the four-dimensional cube.

13. A navigation system comprising:
a display system; and
a flight information identifier configured to identify information for an aircraft; display an aeronautical chart on the display system; and display an envelope in the aeronautical chart based on the information, wherein the envelope defines a space flyable by the aircraft that meets a number of objectives.

14. The navigation system of claim 13, wherein the envelope is displayed in one of two dimensions and three dimensions.

15. The navigation system of claim 13, wherein the flight information identifier is configured to display an indication of undesirable space outside of the envelope.

16. The navigation system of claim 15, wherein the indication of undesirable space is a graphical indicator that obscures a portion of the aeronautical chart outside of the envelope.

17. The navigation system of claim 13, wherein the flight information identifier is configured to display an indication of desired space within the envelope.

18. The navigation system of claim 13, wherein the flight information identifier is further configured to repeat displaying the envelope in the aeronautical chart based on the information in response to the information changing, wherein the envelope defines the space flyable by the aircraft that meets the number of objectives.

19. The navigation system of claim 13, wherein the aeronautical chart is selected from at least one of a vertical view and a top view.

20. The navigation system of claim 13, wherein the flight information identifier is further configured to generate a four-dimensional cube comprised of a plurality of cubes and mark the plurality of cubes with an indication of a type of space based on the information, and wherein in being configured to display the envelope in the aeronautical chart based on the information, the flight information identifier is configured to display the envelope using the four-dimensional cube with the type of space marked for the plurality of cubes in the four-dimensional cube.

* * * * *